United States Patent [19]

Beale et al.

[11] 4,133,931

[45] Jan. 9, 1979

[54] CLOSED CELL PHENOLIC FOAM

[75] Inventors: John H. Beale; Ernest K. Moss, both of St. Petersburg, Fla.

[73] Assignee: The Celotex Corporation, Tampa, Fla.

[21] Appl. No.: 895,752

[22] Filed: Apr. 12, 1978

Related U.S. Application Data

[63] Continuation of Ser. No. 688,066, Mar. 18, 1976.

[51] Int. Cl.² .............................................. B32B 3/26
[52] U.S. Cl. .................................... 428/315; 260/838; 428/310; 428/524; 521/181; 521/116
[58] Field of Search ..................... 260/2.5 F; 428/310, 428/315, 524

[56] References Cited

U.S. PATENT DOCUMENTS

| | | | |
|---|---|---|---|
| 3,968,300 | 7/1976 | Moss et al. | 260/2.5 F |
| 4,036,793 | 7/1977 | Moss | 260/2.5 F |

Primary Examiner—Morton Foelak
Attorney, Agent, or Firm—Littlepage, Quaintance, Murphy, Richardson and Webner

[57] ABSTRACT

A process for producing a closed cell phenolic-resin foam material comprising a phenolic-resin polymer and surfactant which is branched, non-ionic, with a hydroxyl value less than 50 achieved by capping excess hydroxyl groups; the material, and a structural laminate employing the material. The material has a thermal conductivity which is low initially and remains low for a long period of time.

22 Claims, 14 Drawing Figures

FIG.I
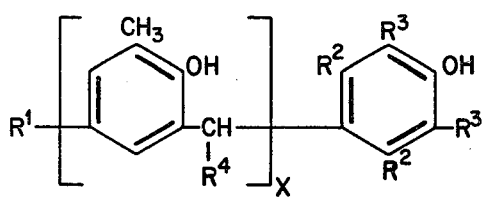
FIG.II
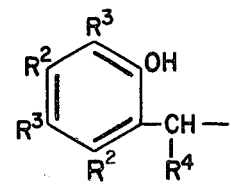
FIG.III
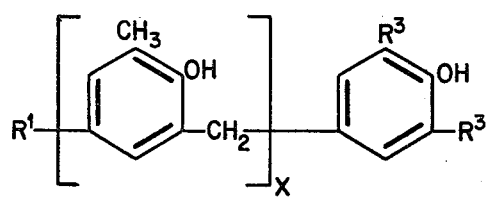
FIG.IV
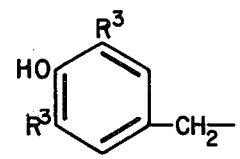
FIG.V
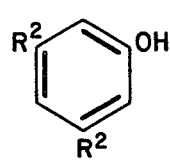
FIG.VI
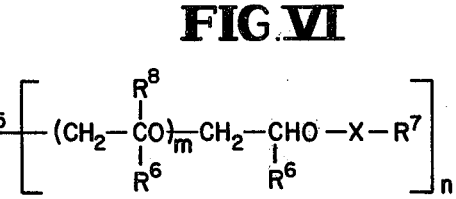
FIG.VII
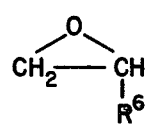
FIG.VIII
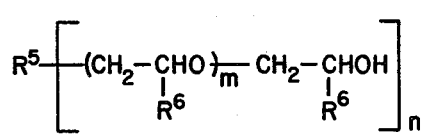
FIG.IX
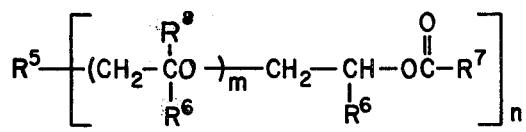
FIG.X
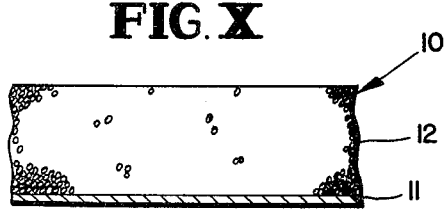
FIG.XI
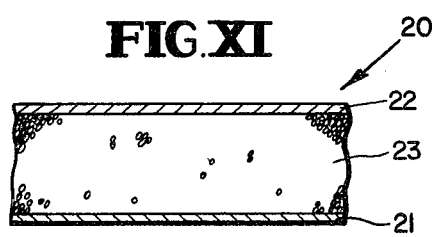

FIG. XII
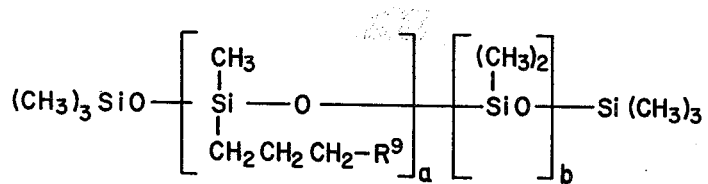
FIG. XIII
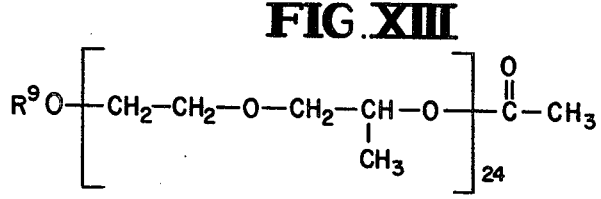
FIG. XIV
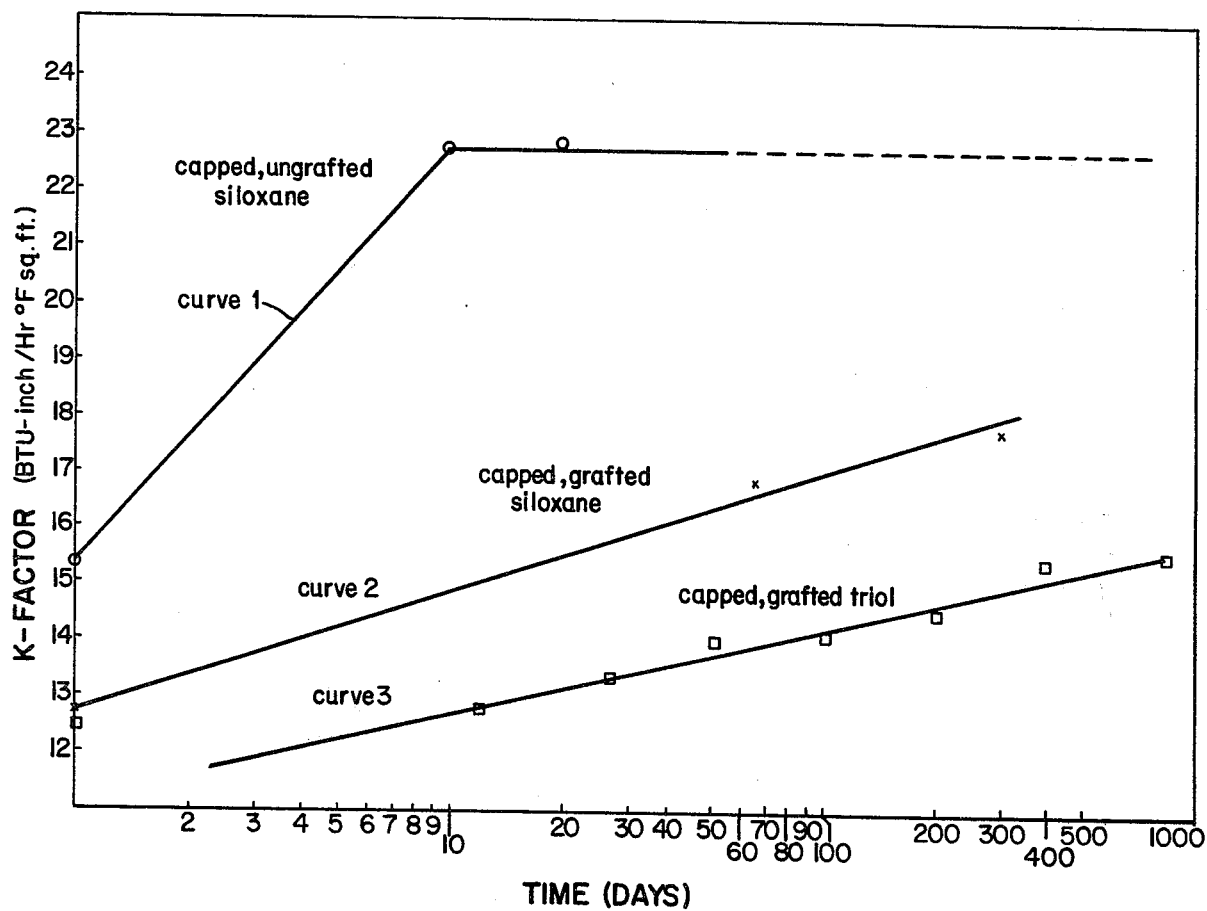

CLOSED CELL PHENOLIC FOAM

This application is a continuation of Ser. No. 668,066, filed Mar. 18, 1976.

Phenolic polymers have been known for decades. More recently there has been increased interest in phenolic polymers which can be formed into cellular materials more commonly referred to as foams. These foams are produced by mixing reactants in the presence of a blowing agent. See for example Thomas et al U.S. Pat. No. 2,744,875 (1956); Nelson Canadian Patent No. 674,181 (1963); Dijkstra Canadian Pat. No. 684,388 (1964); Wissenfels et al Canadian Patent No. 866,876 (1971); United Kingdom specification No. 598,642 (1948); Australian Patent No. 128,508 (1945), and Modern Plastics Encyclopedia Volume 41, pages 362–363 (1964). However, most known cellular materials produced from phenolic polymers exhibit an unsatisfactory thermal conductivity initially. Other known cellular materials produced from phenolic polymers exhibit an undesirable increase in thermal conductivity with time.

Accordingly, it is an object of the present invention to provide an improved closed cell phenolic-resin foam material substantially free of the disadvantages of prior polymers.

Another object is to provide an improved process for producing improved cellular materials employing an improved phenolic polymer, and an improved laminated building panel employing the improved closed cell phenolic-resin foam material.

A still further object is to provide an improved closed cell phenolic-resin foam material which exhibits a high closed cell content without adversely affecting friability, compressive strength and the low flammability characteristics of the material.

Yet another object is to produce a closed cell phenolic-resin foam material with high thermal resistance and high insulation properties and a substantially slow increase in k with time.

A further object is to produce a closed cell phenolic-resin foam material which can be used as building panels which are highly insulating, thermally resistant, low in friability, soundproof and self-supporting.

Additional objects and advantages of the present invention will be apparent to those skilled in the art by reference to the following detailed description and drawings wherein:

FIG. I is Formula I;
FIG. II is Formula II;
FIG. III is Formula III;
FIG. IV is Formula IV;
FIG. V is Formula V;
FIG. VI is Formula VI;
FIG. VII is Formula VII;
FIG. VIII is Formula VIII;
FIG. IX is Formula IX;
FIG. X is a cross-sectional view of a laminated building panel having one facing sheet;
FIG. XI is a cross-sectional view of a laminated building panel having two facing sheets;
FIG. XII is Formula XII;
FIG. XIII is Formula XIII; and
FIG. XIV is a graph of k-factor versus time.

According to the present invention, there is provided a closed-cell cellular composition comprising a phenolic resin foam and a surfactant having hydroxyl number of less than 50 preferably less than 10 by reaction with a capping agent. The process of capping functional groups is well known and common agents for masking the functionality of the hydroxyl group are agents which produce esters, urethanes, and ethers. Phenolic resin foams are a well known class, phenolaldehyde being representative and proportions of blowing agent, catalyst and components are well known in the art.

Foams of low friability can be obtained by using a preferred phenolic polymer described in Moss U.S. Pat. No. 3,876,620. The preferred phenolic polymer is an alkylol group containing phenolic polymer of Formula I shown in FIG. I of the drawings wherein $R^1$ is

hydrogen, or a radical of Formula II.

The $R^2$'s are independently selected from the group consisting of lower alkyl, phenyl, benzyl, halo, nitro, and hydrogen. The $R^3$'s are independently selected from the group consisting of

hydrogen, or a radical of Formula II, shown in FIG. II.

The $R^4$'s are independently selected from the group consisting of lower alkyl, hydrogen, phenyl, benzyl, or furyl. By furyl is meant the radical introduced by the use of furfural. In Formula I, X is an integer from 2 to 10 inclusive and is preferably an integer from 2 to 6 inclusive. When x is less than 2, a foam produced from such a phenolic polymer tends to have too high a friability. On the other hand, as x exceeds 10, the viscosity of the polymer increases to the point where it is difficult to produce the foam. The phenolic polymers of the present invention generally have a molecular weight between 200 and 2,000 and preferably have a molecular weight between 300 and 1500. At lower molecular weights, the resultant foams tend to have too high a friability, whereas at high molecular weights the viscosity of the phenolic polymer, even when a solvent is present, tends to be too high to permit processing.

A preferred subclass of phenolic polymers are those of Formula III, shown in FIG. III.

In Formula III, $R^1$ is $HOCH_2-$, hydrogen, or a radical of Formula IV.

The $R^3$'s are independently selected from the group consisting of $HOCH_2-$, hydrogen, or a radical of Formula IV, shown in FIG. IV.

In a preferred embodiment of the present invention, at least one of the $R^3$'s is methylol, i.e., $HOCH_2-$. This is to ensure that there will be cross-linking sites on the phenolic polymer. Of course, such methylol groups or, when the aldehyde is other than formaldehyde, alkylol groups, are automatically introduced into the polymer as is well-known in the art by the process described below.

In the broadest aspects of the present invention, the phenolic polymer can contain widely varying ratios of the radicals of Formula II or IV to ortho-cresol units. However, this ratio is generally from 1:3 to 3:1 and is preferably from 1:1.5 to 1.5:1. At higher ratios, i.e., a deficiency of ortho-cresol, the cellular material produced from such a phenolic polymer, tends to be too friable. In determining the above ratios, one must include the radicals of Formula II or IV present in Formula I or III respectively. The synthesis of phenolic polymers of Formulae I through IV is described and claimed in the parent application. These phenolic compositions useful in the present invention generally comprise the phenolic polymer of Formula I or Formula III, together with a compound of Formula V.

The compound of Formula V can be present in the phenolic composition in widely varying ratios of compound V to polymeric composition but is generally present in a weight ratio of 1:30 to 1:2 and is preferably present in a weight ratio of 1:20 to 1:5. Examples of suitable compounds of Formula V include among others; m-cresol, m-chlorophenol, m-nitrophenol, 3,5-xylenol, and phenol, i.e., hydroxy benzene. Phenol is the most preferred compound of Formula V because of cost, availability, and reactivity. The phenolic polymers of Formula I and Formula II are produced according to the present invention by combining certain reactants in a two-step process described in the parent application.

In the broadest aspects of the present invention, any aldehyde can be employed to produce useful phenolic polymers. Examples of suitable aldehydes include among others furfural, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material of the present invention is formed by simply reacting the alkylol group containing phenolic polymer of Formula I or Formula III and the compound of Formula V under conditions such that a cellular product will result. As is well known in the phenolic foam art, the reaction can be conducted in the presence of a foaming catalyst, a blowing agent, and a surfactant. The reaction can be performed between temperatures of 10–50° C, preferably 15–25° C, and conveniently at atmospheric pressure. The cellular materials of the present invention generally have a thermal conductivity, k-factor value, of from 0.1 to 0.3 and preferably from 0.1 to 0.2 BTU-inch/Hr-°F-sq. ft. as measured at 24° C. The k-factor value is measured on a Model 88 machine supplied by the ANACON Company. The friability of the cellular material is 20% or less. Friability is the propensity of the foam to break expressed in percent weight loss. This is determined by the ASTM C-421 friability test conducted for 10 minutes.

In the broadest aspects of the present invention, any catalyst which will enhance the cross-linking and foaming reaction can be employed in the present invention. However, the preferred foaming catalysts are aromatic sulfonic acids, examples of which include, among other, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid as described in Mausner et al U.S. Pat. No. 3,458,449. Another foaming catalyst which has been found to give excellent results is a blend of toluene sulfonic acid, phosphoric acid, and water in a weight ratio of 35-50:50-35:15.

The catalyst is generally present in the minimum amount that will give the desired cream times of 10 to 50 seconds and firm times of 40 to 500 seconds to the reacting mixture. The catalyst, however, generally comprises from 0.5 to 20, and preferably comprises from 1.0 to 15, weight percent based on the weight of the cellular material.

Any blowing agent characteristically employed in similar prior art products can be employed in the composition of the present invention. In general, these blowing agents are liquids having an atmospheric pressure boiling point between minus 50 and 100° C and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichloro-fluoromethane plus 1,1,2-trichloro, 1,2,2-trifluoroethane, are the preferred blowng agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

In the broadest aspects of the instant invention, any hydroxyl containing cell stabilizing surfactant with a branched, non-ionic structure conventionally used in producing polymeric foams can successfully be used after capping the hydroxyl groups. By cell stabilizing surfactant is meant one which keeps a foam from collapsing and rupturing. Typical surfactants have hydroxyl numbers in the range of 60 to 100. In other words, any branched conventional surfactant whose hydroxyl number is reduced to a value of less than 50, preferably less than 10, by reaction with a suitable capping agent such as organic acid, acid anhydride, acid chloride, acyloxy chloride and alkyl or aryl isocyanate is a suitable surfactant. Alcohols can be converted to ethers but this generally does not result in a surfactant that behaves as a cell stabilizer. The hydroxyl number is determined by the ASTM-D1638 test.

The surfactant generally is of the Formula VI shown as FIG. VI;

wherein $R^5$ is an organic radical having 3 to 100 reactive groups, preferably 3–40, ideally 3–15;

the $R^6$s are independently selected from the group consisting of hydrogen and methyl;

The $R^7$s are independently selected from the group consisting of alkyl, aryl, aralkyl, and alkaryl;

The $R^8$s are independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms;

X is selected from the group consisting of

m is an integer from 1 to 100 inclusive, but is preferably 5 to 25 inclusive;

n is an integer from 3 to 100 inclusive, but is preferably 3 to 40 and ideally 3 to 15 inclusive.

The organic radical $R^5$ can generally be the residue of an ester, a polysiloxane, a polyhydric alcohol, or other initiators with at least a functionality of three. This insures a highly branched compound.

Specific examples of suitable esters include among others, sorbitan monoesters such as sorbitan monopalmitate, sorbitan monolaurate, sorbitan monostearate, sorbitan monoadipate, sorbitan monooleate, stearic or coconut fatty acid esters, sorbitan tristearate, sorbitan trioleate, and mixtures thereof.

Specific examples of suitable branched, capped polysiloxanes include among others silicone/ethylene-oxide/propylene-oxide copolymers such as alkoxy and polysilylphosphonates.

Specific examples of polyhydric alcohols include among others compounds having 3 to 15 inclusive preferably 3 to 10 inclusive hydroxyl groups. Representative examples of suitable polyhydric alcohols having at least 3 hydroxyl groups include among others: glycerol; 1,2,6-hexanetriol, 1,1,1,-trimethylolpropane; 1,1,1,-trimethylolethane; pentaerythritol; 3-(2-hydroxyethoxy)-1,2-propanediol; 3-(2-hydroxypropoxy)-1,2-propanediol; 6-(2-hydroxyethoxy)-1,2-hexanediol; 2,4-dimethyl-2-(2-hydroxyethoxy) methylpentanediol-1,5; mannitol; galactitol; talitol; iditol; allitol; altritol; gulitol; arabitol; ribitol; xylitol; lyxitol; erythritol; threitol; 1,2,5,6-tetrahydroxy hexane; meso-inositol; sucrose; glucose; galactose; mannose; fructose; xylose; sorbitol; arabinose; 1,1,1-tris [(2-hydroxyethoxy) methyl]ethane and 1,1,1-tris[(2-hydroxypropoxy)methyl]propane. Other examples are included in U.S. Pat. No. 2,917,468. The preferred polyhydric alcohols are glycerol 1,1,1-trimethylolpropane, pentaerythritol, sorbitol 1,1,1,-trimethylolethane, 1,1,1,-trimethylolbutane and galactitol.

In Formula VI the radical $—X—R^7$ is preferably obtained by reaction with a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly aromatic acids, anhydrides and chlorides can be employed. Benzoyl chloride and substituted products of it such as 3,5 dinitrobenzoyl chloride are examples of these. Alkyl and aromatic isocyanates can also be employed. Other factors such as solubility in the surfactant and the solubility of the capped surfactant with a particular phenolic-resin are considerations of which a practitioner in the art is cognizant in selecting the system which will yield the desired closed cell stabilized foam.

Specific surfactants within the definition of Formula VI are grafts of sorbitan (polyoxyethylene acetate)$_5$, sorbitan (polyoxypropylene acetate)$_5$, glycerol tris (polyoxyethylene acetate), glycerol tris (polyoxypropylene propionate), 1,1,1,-trimethylol-propane (polyoxyethylene acetate), pentaerythritol (polyoxy-ethylene acetate), pentaerythritol (polyoxyethylene acetate)$_3$, polyoxyethylene sorbitan palmitate, polydimethyl siloxane polyalkylene oxide block copolymer esterified with a lower alkyl carboxylic acid, polyethylene glycol adipate (polyoxyethylene acetate), polyethylene glycol tartarate (polyoxyethylene acetate) and mixtures thereof. Such grafted surfactants are preferred for low k-drift.

The surfactant may be prepared by reacting the compound having the organic radical $R^5$ with an alkylene oxide of Formula VII (see FIG. VII) or a polymer of Formula VII to yield an intermediate product of Formula VIII (see FIG. VIII). The intermediate product is subsequently reacted under suitable conditions with a carbonyl, or isocyanate containing compound of the Formula $R^7—COOH$, $(R^7CO)_2O$, $R^7COCl$ or $R^7—N=C=O$, to yield a product of Formula VI wherein $R^5$, $R^6$, $R^7$, m, n, and X are as defined before, and $R^8$ is hydrogen.

The intermediate product of Formula VIII or product formula VI where $R^8$ is H can be reacted with vinyl monomers in the presence of a free radical initiator to give Formula VI wherein the $R^8$ is a side chain. Copolymers of N-vinyl pyrrolidone or N-vinyl caprolactam with dialkyl maleate, wherein the alkyl of the maleate has 1 to 5 carbon atoms, are used, wherein the copolymer content of the surfactant comprises 10 to 50 wt percent and preferably 25 to 35 wt percent.

The representation in FIG. VI seems to indicate that the copolymer represented by $R^8$ is attached to the same carbon atom bearing the methyl group if any. This is believed to accurately represent the facts although there is some evidence that the copolymer represented by $R^8$ is attached to the other carbon atom. FIG. VII and the other corresponding figures should be construed to cover the compounds produced in the examples herein and equivalents thereof within the scope of those claimed irrespective of the point of attachment of $R^8$.

Products having Formula VI can also be obtained by reaction of Formula VIII with vinyl monomers in the presence of a free radical initiator followed by reaction with compounds of Formula $R^7COOH$, $(R^7CO)_2O$, $R^7COCl$, or $R^7—N=C=O$.

The preferred uncapped surfactants useful in the present invention are branched polyoxyalkylene polyols which produce a uniform fine-celled foam. Uniformity of cells is determined by visual and microscopic examination. The uncapped surfactants must produce a fine celled foam. This property is tested by mixing 2 to 5% of the surfactant with the phenolic composition and producing a foam as described herein. It is interesting to note that a low surface tension of the surfactant in the phenolic-resin is not a prerequisite to obtaining a good foam. The branched polyoxyalkylene polyols have surface tension values of 32–49 dynes per cm. in the phenolic-resin and gave fine celled foams. Surfactants with low surface tension values of 24–28 dynes per cm. also gave fine celled foams.

FIG. VII which is Formula VII is generic to ethylene oxide and propylene oxide "m" units of which can be employed to produce the surfactants of FIGS. VI and VIII which are respectively Formulas VI and VIII.

The average cell size diameter must be less than 0.5 mm and is preferably less than 0.2 mm. Fine celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is redetermined at various time intervals up to about 1000 days. A material exhibiting fast k-drift will attain a k-factor (BTU/hr/°F/ft$^2$ per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or lower values is maintained, the longer the service life of the insulation.

Ball, Hurd and Walker have published a comprehensive discussion of k-factor changes as a function of time. ("The Thermal Conductivity of Rigid Urethane Foams", J. Cellular Plastics, March/April, 1970, pp 66-78.) F. Norton ("Thermal Conductivity and Life of Polymer Foams", J. Cellular Plastics, January, 1967, pp 23-37) has shown that diffusion of fluorocarbon gases out of unfaced foam and infusion of air into the foam causes an increase in k-factor. A slow k-drift foam is defined as one that attains a k-factor at 24° C of 0.15–0.17 after 200-400 days and then remains below 0.2 k-factor for 5-10 years. Eventually all fluorocarbon diffuses from the foam to leave a closed cell material which contains only air in the cells.

The k-factor for the closed cell foam containing only air falls in the range of 0.22 - 0.26 BTU/hr/°F/ft$^2$ per inch thickness at 24° C for the 2-3 lbs/ft$^3$ density range. Therefore, if a foam exhibits greater than 0.2 k-factor after a short period of time (less than 25 days), then substantially all fluorocarbon has diffused from the foam and has been replaced by air. On the other hand, if k-factor remains below 0.2 for at least 100 days then a substantial amount of fluorocarbon gas remains in the closed cells of the foam in spite of infusion of air.

It has been found that capping the surfactant that yields a fine celled foam increases the closed cell content and the initial k-factor is lowered.

Moreover, capping and grafting the surfactant yield a fine celled foam with high closed cell content, a low initial k-factor and a low k drift value.

The surfactant is employed in a cell stabilizing amount. Generally the surfactant comprises from 0.05 to 10, and preferably comprises from 0.1 to 6, weight percent of the composition. Too little surfactant fails to stabilize the foam and too much surfactant is not only wasteful, but also for surfactants having relatively high surface tension (about 35 dynes/cm) may lead to larger cell structure by cell coalescence and the foam may collapse. Highly branched, non-ionic, capped, grafted surfactants are preferred.

As used herein any of the alkyl, aryl, aralkyl, and/or alkaryl groups can be substituted with one or more groups that do not materially affect the physical or chemical properties of the surfactant compound. Examples of aryl substituents include, among others, —F, —Cl, —Br, —CH$_3$, and —NO$_2$.

Referring now to the drawings, and in particular to FIG. X, there is shown a laminated building panel 10 of the present invention. The building panel 10 comprises a single facing sheet 11 having thereon a cellular material 12 of the present invention. FIG. XI shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

FIG. XIV shows plots of k-factor versus time on a linear/log scale whereby the measured k-factor is plotted on the y-axis (linear scale) while the time in days is plotted on the x-axis (log scale) as described by Ball, Hurd, and Walker.

Fast k-drift materials attain greater than 0.2 k-factors rapidly as shown by curve (1) and then level out at 0.22 to 0.26. Slow k-drift materials attain less than 0.2 k-factors as shown by curve (2) and (3) of FIG. XIV.

The foam stabilized by a capped, nongrafted siloxane surfactant reached a k-factor of about 0.23 after 10 days. This differs from the capped, grafted siloxane stabilized foam (curve 2) which was less than 0.2 k-factor after 200 days. A capped, grafted triol was less than 0.16 k-factor after about 900 days.

The k-factor versus time results compiled in Tables I and II were obtained by reading the k-factor at selected time intervals of 25, 100, 200, 500 and 900 days from curves of the k-factor versus time plots shown in FIG. XIV.

As shown in Table II, all cellular materials stabilized with capped, grafted, branched surfactants gave low k-drift values as compared to the foam stabilized by ungrafted surfactants. Tables I and II show that capped surfactants without grafts of vinyl monomers gave low initial k-factors.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example is illustrative of the synthesis of a phenolic polymer useful in the present invention.

The following quantities of the following ingredients are combined as illustrated.

| Item | Name | Quantity grams | gram-moles |
|---|---|---|---|
| A | ortho-cresol | 389 | 3.6 |
| B | HCHO (93.6% paraformaldehyde) | 144 | 4.5 |
| C | NaOH (50% solution) | 7.2 | 0.09 |
| D | HCHO | 121 | 3.8 |
| E | phenol | 338 | 3.6 |
| F | acetic acid | 6 | 0.1 |

Items A, B, and C are reacted at 90° C for 4.75 hours in Step I to form a mixture. In Step II, items D and E are added to the mixture of Step I and the temperature is maintained at 90° C for 2 hours. Then Item F is added to neutralize to a pH of 5.0 to 7.0 and the reaction products are cooled to room temperature.

The items are calculated to be present in the following molar ratios:

| | |
|---|---|
| phenol: o-cresol | 1:1 |
| sites ratio 2(cresol) + 3(phenol): CH$_2$O | 1:0.46 |
| HCHO: o-cresol, Step 1 | 1.25:1 |
| NaOH: (phenol + o-cresol) | 1:80 |

The reaction products produced above had a viscosity of 17,000 centipoises at 25° C and constitute a phenolic polymer of the present invention which analyzes as follows:

| phenol | 10.7 weight percent |
| --- | --- |
| cresol | 0.1 weight percent |
| formaldehyde | 0.15 weight percent |
| water | 9.1 weight percent |
| phenolic polymer | balance |

EXAMPLE 2

This example is illustrative of the synthesis of a phenolic polymer useful in the present invention.

A resole of phenol and formaldehyde was prepared as in example 18 of U.S. Pat. No. 3,876,620. The viscosity was 36,000 cp at 26° C and the solution analyzed as follows:

| phenol | 8.9 weight percent |
| --- | --- |
| formaldehyde | 1.2 weight percent |
| water | 9.6 weight percent |
| phenolic polymer | balance |

EXAMPLE 3

This example illustrates the synthesis of foaming catalysts useful in the present invention.

The following quantities of the following ingredients are combined as indicated to produce Catalyst A:

| Ingredients | | Quantity |
| --- | --- | --- |
| Item | Name | grams |
| A | p-toluene sulfonic acid | 333 |
| B | xylene sulfonic acids | 333 |
| C | water | 333 |

Items A, B, and C are mixed. The resultant composition is termed Catalyst A.

The following quantities of the following ingredients are combined as indicated to produce Catalyst B:

| Ingredients | | Quantity |
| --- | --- | --- |
| Item | Name | grams |
| A | Ultra TX | 667 |
| B | water | 333 |

Items A and B are mixed. The resultant composition is termed Catalyst B. Ultra TX is a mixture of equal parts by weight of p-toluene sulfonic acid and xylene sulfonic acids available from the Witco Chemical Company.

EXAMPLE 4

This example is illustrative of the synthesis of an acetate capped commercially available surfactant, PFA-1200, which is a polysiloxane polymer available from General Electric Company useful in the instant invention.

Eighty grams of PFA-1200 (containing 1.96 × $10^{-3}$ mole OH/g) which is 1.57 × $10^{-1}$ mole OH and 21.7g (2.13 × $10^{-1}$ mole) of acetic anhydride were reacted together in the presence of 0.3 g of zinc chloride for two hours at 100° C.

EXAMPLES 5–9

These examples are illustrative of synthesis of different capped surfactants. The procedure of Example 4 was repeated except that the surfactants were varied. Example 5 shows PFA 1400; Example 6, TWEEN 40: Example 7, L-5420; Example 8, L-5320; and Example 9, EL-719. The k-factor value and hydroxyl number are recorded in Table I.

TABLE I

| | | | | | Capped Surfactant Results | | | | | | | |
| --- | --- | --- | --- | --- | --- | --- | --- | --- | --- | --- | --- | --- |
| | | | | | | Acetate Capped | | | | | 3,5-Dinitro-Benzoate Capped | |
| Cellular Material Example No. | Surfactant | Uncapped | | Cellular Material Example No. | Surfactant Example No. | OH No. | k-factor | | Cellular Material Example No. | Surfactant Example No. | OH No. | k-factor |
| | | OH No. | k-factor | | | | initial | 25 Days | | | | initial | 25 Days |
| 19 | PFA-1200[b] | 100 | .26 | 26 | 4 | 0 | .17 | .24 | 32 | 10 | 19 | .16 | — |
| 20 | PFA-1400[b] | 94 | .24 | 27 | 5 | 0 | .19 | — | 33 | 11 | 21 | .20 | — |
| 21 | TWEEN 40[a] | 56— | .26 | 28 | 6 | 18.5 | .19 | — | — | — | — | — | — |
| 22 | L-5420[f] | 157 | .28 | 29 | 7 | 40 | .16 | .23 | — | — | — | — | — |
| 23 | L-5320[f] | 144 | .28 | 30 | 8 | 25 | .14 | .24 | — | — | — | — | — |
| 24 | EL-719[e] | 30 | .27 | 31 | 9 | 0 | .14 | — | — | — | — | — | — |
| 25 | OC-193[c] | 70 | .27 | — | — | — | — | — | 34 | 12 | 12 | .15 | .22 |
| 25a | TWEEN 40[a] | 56 | .26 | 31a* | — | 15 | .18 | — | | | | | |

*Example 31a capped with ethyl isocyanate
[a] a polyethoxylated sorbitan monopalmitate available from Atlas
[b] polysiloxane graft polymers with allylically-bound ethylene oxide and propylene oxide along the backbone available from GE
[c] similar to b but sold by Dow Corning
[e] polyethoxylated vegetable-oil available from General Aniline and Film Corp.
[f] available from Union Carbide

EXAMPLES 10–12

These examples are illustrative of the synthesis of capped surfactants DC-193, PFA-1400 and PFA-1200 (See Table I for identification of the surfactant) wherein the capping agent is 3,5-dinitrobenzoyl chloride. See Table I.

An amount equal to 0.1 mole of each surfactant is reacted with a stoichiometric amount of 3,5-dinitrobenzoyl chloride at 90° C for an hour. The product was cooled and the dissolved hydrogen chloride was removed.

| Example No. | Original OH Number | Capped OH Number |
| --- | --- | --- |
| 10 DC 193 | 65 | 15.4 |
| 11 PFA-1400 | 94 | 21 |
| 12 PFA-1200 | 100 | 19 |

The conversion to capped product was quantitatively estimated by following the decrease of hydroxyl absorbance in the 2700–2800 nm range of the infrared spectrum. The estimate of conversion is expressed as hydroxyl number.

EXAMPLE 13

This example is illustrative of synthesizing a preferred surfactant of the instant invention.

Onto a glycerol substrate are copolymerized 50 weight percent each of ethylene oxide and propylene oxide onto this polyol is graft polymerized 25 weight percent of an equimolar mixture of N-vinyl pyrrolidone and dibutylmaleate in accordance with the procedure of Beale & Carroll U.S. Pat. No. 3,746,663.

The reaction product is treated with acetic anhydride to form acetate esters on the terminal hydroxyl groups.

EXAMPLE 14

This example represents the synthesis of a preferred surfactant of the instant invention.

The procedure of Example 13 was repeated employing the same conditions and quantities of the same ingredients with the single exception that the equimolar mixture of N-vinyl pyrrolidone and dibutylmaleate was increased to 35 weight percent as based on the glycerol base triol.

EXAMPLE 15

This example represents the synthesis of a preferred surfactant of the instant invention.

The procedure of Example 13 was followed employing the same conditions and ingredients with the single exception that the N-vinyl pyrrolidone was replaced with N-vinyl caprolactam in the equimolar mixture with dibutylmaleate at 25 weight percent based on the glycerol base triol.

EXAMPLE 16

This example represents the synthesis of a preferred surfactant of the instant invention.

The procedure of Example 13 was followed employing the same ingredients and conditions with the exceptions that a tetrol base polyol was used and the equimolar mixture of N-vinyl pyrrolidone and dibutylmaleate was 33 weight percent of the base polyol.

EXAMPLES 17 and 18

Branched polysiloxanes of the formula XII with $R^9$ as defined in Formula XIII were synthesized.

EXAMPLE 17

Siloxane surfactant of Formula XII with "a" having a value of 3 and "b" in Formula XII a value of 7. Three hundred grams of the surfactant were placed in a reaction vessel and flushed with nitrogen. The temperature of the polyol was raised to 90° C. Equimolar quantities of nitrogen flushed N-vinyl pyrrolidone (58 g) and dibutylmaleate (105 g) were added over a period of two hours from separate addition funnels. The dibutylmaleate contained 3 g. benzoyl peroxide. After the first half hour's reaction, the temperature was raised to 110° C. and held there for two hours. The product was then cooled and used as a phenolic foam surfactant. The viscosity of siloxane polyol was 680 cp (24.4° C) and that of the product was 1,480 cp (24.4° C). The grafted product contains 35 weight percent polymerized vinylic monomers.

EXAMPLE 18

The procedure of Example 17 was followed with siloxane polyol of Formula XII in which "a" is 30 and "b" is 90. The viscosity of the starting polyol was 1840 cp (24.8° C). The viscosity of the graft-polymer containing product was 3816 cp (24.8° C).

EXAMPLE 19

This example illustrates the synthesis of a cellular material comparative of the present invention.

The following quantities of the following ingredients are combined as indicated:

| Item | Ingredients Name | Quantity grams |
|---|---|---|
| A | phenolic polymer of Example 1 | 240 |
| B | phenol | 33 |
| C | Catalyst B | 39 |
| D | $CFCl_3/CF_2Cl-CCl_2F$ in 1:1 weight ratio | 45 |
| E | Surfactant PFA-1200 | 12 |
| F | Water | 27 |

Items A through F are mixed in an open vessel for 15 seconds. The mixture is then poured into a square paper box twelve inches by twelve inches by five inches tall. A foaming reaction ensues. After a period of about 240 –300 seconds the material is rigid. The box and contents are placed in an oven at 55° to 75° C. for a period of ten minutes to one hour. Items A, B and F exist in the form of (300 g) of the phenolic polymer of Example 1.

The k-factor value is measured in a Dynatech or Anacon machine after several hours and again at time intervals of at least 1 week. The hydroxyl number of the surfactant is entered in the table for comparative purposes.

EXAMPLES 20 –25

These examples illustrate synthesis of cellular materials comparative of the present invention.

The procedure of Example 19 was repeated employing the same conditions and ingredients with the single exception that Item E was replaced by an equal amount of differing surfactants. Example 20 employed PFA-1400; Example 21, TWEEN 40; Example 22, L-5420; Example 23, L-5320; Example 24, EL-719; and Example 25, DC-193. The k-factor values are shown in Table I.

EXAMPLE 25a

The procedure of Example 19 is repeated with polyoxyethylenesorbitanpalmitate which is capped with ethyl isocyanate. The results are recorded in Table I.

EXAMPLES 26–34

These examples illustrate the synthesis of a cellular material of the present invention.

The same procedure as in Example 19 was repeated employing the same conditions and ingredients with the exception that for Item E acetate-capped surfactants from PFA-1200, PFA-1400, TWEEN 40, L-5420, and L-5320 and EL-719 were used for Examples 26–31 respectively and 3,5-dinitrobenzoate capped surfactants of PFA-1200, PFA-1400, and DC-193 for Examples 32–34 respectively. Example 31a shows TWEEN 40 capped with ethylisocyanate for Item E. All results are compiled in Table I.

As can be seen from Table I, all capped surfactants lowered the initial k-factor in comparison to the uncapped surfactants. Table I also shows that the k-drift was rapid for all surfactants evaluated in the k-drift test.

EXAMPLE 35

This example illustrates the synthesis of a cellular material using the preferred surfactant of the instant invention. The following quantities of ingredients listed below are reacted and/or mixed as indicated:

| Item | Ingredients Name | Quantity grams |
|---|---|---|
| A | phenolic polymer of Example 1 | 240 |
| B | phenol | 33 |
| C | Catalyst B | 45 |
| D | $CFCl_3 : CCl_2FCF_2Cl$ (1:1 weight ratio) | 45 |
| E | Surfactant from Ex. 13 | 15 |
| F | Water | 27 |

The same procedure as in Example 19 was followed. The initial k-factor was 0.125 Btu/hr F°ft²inch.

EXAMPLES 36–38

These examples illustrate synthesis of a cellular material with the preferred surfactants of this invention. The procedure of Example 35 was repeated employing the same conditions and quantities of ingredients with the single exception that surfactants from Examples 14, 15 and 16 were used for Item E. Densities, percentages of closed cells, friabilities, and k-factors are shown in Table II.

EXAMPLES 39–40

These examples are comparative of the present invention.

The procedure of Example 35 was repeated employing the same conditions and quantities of ingredients except that the ungrafted surfactants used as starting materials in Examples 17 and 18 were employed as Item E. Densities, percentages of closed cells friabilities and k-factors are shown in Table II.

EXAMPLES 41–42

These examples illustrate the synthesis of cellular material of the present invention using the preferred surfactants.

The procedure of Example 35 was repeated employing the same conditions and quantities of ingredients except the grafted surfactants prepared in Examples 17 and 18 were used as Item E.

Densities, percentage of closed cells, friabilities and k-factors are shown in Table II.

TABLE II

Capped, Grafted Surfactants

| Cellular Material Example No. | Surfactant Example No. | Surfactant Description | Friability % | Density lbs. per cu. ft. | % Closed Cells | k-Factor Initial | 25 | No. of Days 100 | 200 | 500 | 900 |
|---|---|---|---|---|---|---|---|---|---|---|---|
| 35 | 13 | Acetate capped triol, grafted with DBM***/ NVP* 25 wt.% of NVP+DBM | 13 | 3.0 | 88–90 | .125 | .134 | .142 | .146 | .152 | .155 |
| 36 | 15 | Acetate capped triol, grafted with DBM/NVC** 25 wt.% of NVC+DBM | 18.5 | 2.3 | 81 | .12 | .16 | .20 | — | — | — |
| 37 | 14 | Acetate capped triol, grafted with DBM/NVP, 35 wt.% of NVP+DBM | 15 | 2.3 | 85 | .12 | .15 | .17 | .18 | .19 | — |
| 38 | 16 | Acetate capped tetrol, grafted with DBM/NVP (33% monomer) | 20 | 2.6 | 85 | .12 | .13 | .15 | — | — | — |
| 39 | — | Acetate capped, siloxane a = 3, b = 7 | 12 | 2.5 | 92 | .14 | .26 | — | — | — | — |
| 40 | — | Acetate capped siloxane a = 90, b = 30 | 12 | 2.8 | 85 | .154 | .230 | .230 | — | — | — |
| 41 | 17 | Acetate capped siloxane a = 7, b = 3, grafted with DBM/NVP (35% monomer) | 12 | 2.7 | — | .12 | .157 | .170 | .176 | — | — |
| 42 | 18 | Acetate capped siloxane a = 30, b = 90, grafted with DBM/NVP (35% monomer) | 12 | 2.7 | — | .13 | .174 | .194 | .195 | — | — |

*NVP = N-vinyl pyrrolidone
**NVC = N-vinyl caprolactam
***DBM = dibutyl maleate

EXAMPLE 43

This example illustrates the synthesis of a cellular material from the polymer of Example 2. The following quantities of ingredients are combined as indicated.

| Item | Ingredients Name | Quantity Grams |
|---|---|---|
| A | phenolic polymer of Ex. 2 | 244.5 |
| B | phenol | 26.7 |
| C | Catalyst B | 40 |
| D | $CFCl_3 : CCl_2F—CF_2Cl$ (1:1 weight ratio) | 55 |
| E | polydimethylsiloxane polyalkylene oxide block copolymers reacted with lower anhydride | 18 |
| F | water | 28.8 |

The same procedure as in Example 19 was followed to prepare the cellular material. Several hours later the density and friability and the k-factor are determined. The properties found:
Density 2.2 pounds per cubic foot
Friability 30%
K-factor 0.131
Closed cell 90%.

EXAMPLES 44–52

The following examples shown in Table III are not illustrative of the invention and are included for purposes of comparison. Examples 44 through 52 illustrate the synthesis of cellular material in the same way as Example 19 except that in each example the uncapped surfactant was varied. The examples illustrate that the surfactant must be able to produce a fine cell foam and stabilize the foam. It can be seen that linear and ionic surfactants are not suitable.

EXAMPLE 53

This example illustrates the synthesis of a cellular material of the present invention.

The procedure of Example 26 is repeated except that the surfactant employed is that produced in accordance with Example 4 of U.S. Pat. No. 3,914,188 with substantially similar results.

EXAMPLE 54

This example illustrates the synthesis of a cellular material of the present invention.

The procedure of Example 26 is repeated except that the surfactant employed is that produced in accordance with Example 14 of U.S. Pat. No. 3,914,188 with substantially similar results.

Although the invention has been described in considerable detail with reference to certain preferred embodiments thereof, it will be understood that variations and modifications can be effected within the spirit and scope of the invention as described above and as defined in the appended claims.

TABLE III

| Example | Surfactant | Characterization of Surfactant | Density | Friability | Gas Release Coarse-celled Foam |
|---|---|---|---|---|---|
| 44 | Triton X-102[k] | linear, nonionic | 2.3 | * | X |
| 45 | Tergitol 15-S-5[l] | linear, nonionic | 12.7 | * | X |
| 46 | Tergitol TMN[m] | linear, nonionic | 4.4 | * | X |
| 47 | Tergitol NPX[n] | linear, nonionic | 4.4 | * | |
| 48 | Aliphal CO436[o] | linear, anionic | 1.3 | 18.2 | |
| 49 | Triton GR-7[p] | linear, anionic | 2.9 | * | X |
| 50 | Monazoline O[q] | Cationic | 2.6 | 10.8 | |
| 51 | Monazoline[r] | Cationic | 5.1 | * | X |
| 52 | Zonyl S-13[s] | Anionic | >5.0 | * | X |

[k] - octyl phenoxy polyethoxy ethanol (Rohm & Haas Co.)
[l] - polyethoxylated "linear alcohol" (Union Carbide Corp.)
[m] - polyethoxylated trimethylnonyl alcohol
[n] - nonylphenyl polyoxyethyl alcohol (k, l, m or n available from Union Carbide Corp.)
[o] - ammonium salt of a sulfate ester of an alkylphenyloxypolyethyleneoxy ethanol (GAF)
[p] - dioctyl sodium sulfosuccinate
[q] - imidazoline salt of oleic acid} (available from Mona Industries)
[r] - oxazoline salt of oleic acid
[s] - fluoroalkyl phosphate, (duPont de Nemours Co.)
*too coarse to measure; friability defined as 100 in 10 min. test.

What is claimed is:

1. A laminated structural panel having at least one facing sheet and having adhered to it a closed cell foam material comprising the reaction product of:
   A. phenolic-resin,
   B. a blowing agent,
   C. a surfactant characterized in that it is branched, non-ionic, has a hydroxyl value less than 50 and its hydroxyl groups which would otherwise give the surfactant a higher hydroxyl value are capped.

2. A laminated structural panel having at least one facing sheet and having adhered to it a closed cell foam material of claim 1 comprising the reaction product of:
   A. an alkylol group containing phenolic polymer of Formula I of the attached drawings wherein:
   (a) $R^1$ is

hydrogen, or a radical of Formula II of the attached drawings,
   (b) the $R^2$'s are independently selected from the group consisting of lower alkyl, phenyl, benzyl, halo, nitro and hydrogen,
   (c) the $R^3$'s are independently selected from the group consisting of

hydrogen, or a radical of Formula II of the attached drawings,
   (d) the $R^4$'s are independently selected from the group consisting of lower alkyl, hydrogen, phenyl, benzyl, or furyl,
   (e) x is an integer from 2 to 10 inclusive,
   (f) the phenolic polymer has a molecular weight between 200 and 2000,
   B. a compound of Formula V of the attached drawings wherein the weight ratio of B:A is 1:30 to 1:2.
   C. a blowing agent in a minor amount sufficient to foam the reaction mixture, and
   D. a surfactant, said surfactant characterized in that it:
   a. is branched,
   b. is non-ionic,
   c. has a hydroxyl value less than 50,
   d. has its hydroxyl groups which would otherwise give the surfactant a higher hydroxyl value capped.

3. A laminated structural panel having at least one facing sheet and having adhered to it a closed cell foam material of claim 1 comprising the reaction product of:
   A. a methylol group containing phenolic polymer of Formula III of the attached drawings wherein:
   (a) $R^1$ is $HOCH_2$—, hydrogen or a radical of Formula IV of the attached drawings,
   (b) the $R^3$'s are independently selected from the group consisting of $HOCH_2$—, hydrogen or a radical of Formula IV of the attached drawings,
   (c) x is an integer from 3 to 6 inclusive,
   (d) the phenolic polymer has a molecular weight between 300 and 1500,
   B. phenol, wherein the weight ratio of B:A is 1:20 to 1:5, C. a blowing agent in a minor amount sufficient to foam the reaction mixture, and
D. a surfactant characterized in that it
   a. is branched,
   b. is non-ionic,
   c. has a hydroxyl value less than 50,
   d. has its hydroxyl groups which would otherwise give the surfactant a higher hydroxyl value capped.

4. A laminated structural panel having at least one facing sheet and having adhered to it a closed cell foam material of claim 1 comprising the reaction product of:
A. phenolic-resin
B. a blowing agent, and
C. a surfactant that is characterized in that it:
   a. is branched,
   b. is non-ionic,
   c. has a hydroxyl value less than 30,
   d. has its hydroxyl groups which would otherwise give the surfactant a higher hydroxyl value capped by a capping agent which forms an ester.

5. A laminated structural panel having at least one facing sheet and having adhered to it a closed cell foam material of claim 1 comprising the reaction product of:
A. an alkylol group containing phenolic polymer of Formula I of the attached drawings wherein:
   (a) $R^1$ is

hydrogen, or a radical of Formula II of the attached drawings,
   (b) the $R^2$'s are independently selected from the group consisting of lower alkyl, phenyl, benzyl, halo, nitro and hydrogen,
   (c) the $R^3$'s are independently selected from the group consisting of

hydrogen, or a radical of Formula II of the attached drawings,
   (d) the $R^4$'s are independently selected from the group consisting of lower alkyl, hydrogen, phenyl, benzyl, or furyl,
   (e) x is an integer from 2 to 10 inclusive,
   (f) the phenolic polymer has a molecular weight between 200 and 2000,
B. a compound of Formula V of the attached drawings wherein the weight ratio of B:A is 1:30 to 1:2,
C. a blowing agent in a minor amount sufficient to foam the reaction mixture, and
D. a minor amount of a surfactant, said surfactant characterized in that it:
   (a) is branched,
   (b) is non-ionic,
   (c) has a hydroxyl value less than 30, and
   (d) has its hydroxyl groups which would otherwise give the surfactant a higher hydroxyl value capped by a capping agent which forms an ester.

6. A laminated structural panel having at least one facing sheet and having adhered to it a closed cell foam material of claim 1 comprising the reaction product of:
A. a methylol group containing phenolic polymer of Formula III of the attached drawings wherein:

(a) $R^1$ is $HOCH_2-$, hydrogen or a radical of Formula IV of the attached drawings,
   (b) the $R^3$'s are independently selected from the group consisting of $HOCH_2-$, hydrogen or a radical of Formula IV of the attached drawings,
   (c) x is an integer from 3 to 6 inclusive,
   (d) the phenolic polymer has a molecular weight between 300 and 1500,
B. phenol, wherein the weight ratio of B:A is 1:20 to 1:5.
C. a blowing agent in a minor amount sufficient to foam the reaction mixture, and
D. a minor amount of a surfactant, said surfactant characterized in that it:
   (a) is branched,
   (b) is non-ionic,
   (c) has a hydroxyl value less than 30, and
   (d) has its hydroxyl groups which would otherwise give the surfactant a higher hydroxyl value capped by a capping agent which forms an ester.

7. A laminated structural panel having at least one facing sheet and having adhered to it a closed cell foam material of claim 1 comprising the reaction product of:
A. phenolic-resin
B. a blowing agent, and
C. a surfactant that
   a. is branched,
   is non-ionic,
   c. has a hydroxyl value less than 10,
   d. has its hydroxyl groups which would otherwise give the surfactant a higher hydroxyl value capped with an acetate,
   e. is 0.05 to 10 weight percent of the foam.

8. A laminated structural panel having at least one facing sheet and having adhered to it a closed cell foam material of claim 1 comprising the reaction product of:
A. an alkylol group containing phenolic polymer of Formula I of the attached drawings wherein:
   (a) $R^1$ is

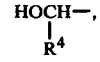

hydrogen, or a radical of Formula II of the attached drawings,
   (b) the $R^2$'s are independently selected from the group consisting of lower alkyl, phenyl, benzyl, halo, nitro and hydrogen,
   (c) the $R^3$'s are independently selected from the group consisting of

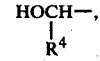

hydrogen, or a radical of Formula II of the attached drawings,
   (d) The $R^4$'s are independently selected from the group consisting of lower alkyl, hydrogen, phenyl, benzyl, or furyl,
   (e) x is an integer from 2 to 10 inclusive,
   (f) the phenolic polymer has a molecular weight between 200 and 2000,
B. a compound of Formula V of the attached drawings wherein the weight ratio of B:A is 1:30 to 1:2,
C. a blowing agent, and
D. a surfactant that:
   (a) is branched, (b) is non-ionic,
(c) has a hydroxyl value less than 10,
(d) has its hydroxyl groups which would otherwise give the surfactant a higher hydroxyl value capped with an acetate,
(e) is 0.05 to 10 weight percent of the foam.

9. A laminated structural panel having at least one facing sheet and having adhered to it a closed cell foam material of claim 1 comprising the reaction product of:
A. a methylol group containing phenolic polymer of Formula III of the attached drawings wherein:
   (a) $R^1$ is $HOCH_2$—, hydrogen or a radical of Formula IV of the attached drawings,
   (b) the $R^3$'s are independently selected from the group consisting of $HOCH_2$—, hydrogen or a radical of Formula IV of the attached drawings,
   (c) X is an integer from 3 to 6 inclusive,
   (d) the phenolic polymer has a molecular weight between 300 and 1500, and
B. phenol, wherein the weight ratio of B:A is 1:20 to 1:5,
C. 1:1 weight ratio of $CFCl_3/CF_2Cl$—$CCl_2F$ wherein its weight percent of the foam is from 5 to 20,
D. catalyst of p-toluene sulfonic acid and xylene sulfonic acid and water wherein its weight percent of the foam is from 1 to 15, and
E. a surfactant that:
   a. is branched,
   b. is non-ionic,
   c. has a hydroxyl value less than 10,
   d. has its groups which would otherwise give the surfactant a higher hydroxyl value capped with an acetate,
   e. is 0.1 to 6 weight percent of the foam,
   f. and wherein the $CFCl_3/CF_2Cl$—$CCl_2F$ is contained within the cells, and the process is practiced at atmospheric pressure and at a temperature between 10° and 50° C.

10. A laminated structural panel having at least one facing sheet and having adhered to it a closed cell foam material comprising the reaction product of:
A. phenolic-resin
B. a blowing agent,
a surfactant which is a surfactant of Formula VI of the attached drawings wherein:
   (a) $R^5$ is an organic radical having 3 to 100 reactive groups,
   (b) the $R^6$'s are independently selected from the group consisting of hydrogen and methyl,
   (c) the $R^7$'s are independently selected from the group consisting of alkyl, aryl, aralkyl, and alkaryl,
   (d) X is selected from the group consisting of

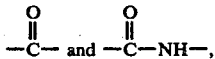

(e) m is an integer from 1 to 100 inclusive,
   (f) n is an integer from 3 to 100 inclusive,
   (g) $R^8$ is independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms.

11. A laminated structural panel having at least one facing sheet and having adhered to it a closed cell foam material of claim 10 comprising the reaction product of:
A. an alkylol group containing phenolic polymer of Formula I of the attached drawings wherein:
   (a) $R^1$ is

hydrogen, or a radical of Formula II of the attached drawings,
   (b) the $R^2$'s are independently selected from the group consisting of lower alkyl, phenyl, benzyl, halo, nitro and hydrogen,
   (c) the $R^3$'s are independently selected from the group consisting of

hydrogen, or a radical of Formula II of the attached drawings,
   (d) the $R^4$'s are independently selected from the group consisting of lower alkyl, hydrogen, phenyl, benzyl, or furyl,
   (e) x is an integer from 2 to 10 inclusive,
   (f) the phenolic polymer has a molecular weight between 200 and 2000,
B. a compound of Formula V of the attached drawings wherein the weight ratio of B:A is 1:20 to 1:2.
C. a blowing agent in a minor amount sufficient to foam the reaction mixture, and
D. a surfactant which is a surfactant of Formula VI of the attached drawings wherein:
   (a) $R^5$ is an organic radical having 3 to 100 reactive groups,
   (b) the $R^6$'s are independently selected from the group consisting of hydrogen and methyl,
   (c) the $R^7$'s are independently selected from the group consisting of alkyl, aryl, aralkyl, and alkaryl,
   (d) X is selected from the group consisting of

(e) m is an integer from 1 to 100 inclusive,
   (f) n is an integer from 3 to 100 inclusive,
   (g) $R^8$ is independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms.

12. A laminated structural panel having at least one facing sheet and having adhered to it a closed cell foam material of claim 10 comprising the reaction product of:
A. a methylol group containing phenolic polymer of Formula III of the attached drawings wherein:
   (a) $R^1$ is $HOCH_2$—, hydrogen or a radical of Formula IV of the attached drawings,
   (b) the $R^3$'s are independently selected from the group consisting of $HOCH_2$—, hydrogen or a radical of Formula IV of the attached drawings,
   (c) x is an integer from 3 to 6 inclusive,
   (d) the phenolic polymer has a molecular weight between 300 and 1500,
B. phenol, wherein the weight ratio of B:A is 1:20 to 1:5.
C. a blowing agent in a minor amount sufficient to foam the reaction mixture, and
D. a surfactant which is a surfactant of Formula VI of the attached drawings wherein:

(a) $R^5$ is an organic radical having 3 to 100 reactive groups,
(b) the $R^6$'s are independently selected from the group consisting of hydrogen and methyl,
(c) the $R^7$'s are independently selected from the group consisting of alkyl, aryl, aralkyl, and alkaryl,
(d) X is selected from the group consisting of

(e) m is an integer from 1 to 100 inclusive,
(f) n is an integer from 3 to 100 inclusive,
(g) $R^8$ is independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms.

13. A laminated structural panel having at least one facing sheet and having adhered to it a closed cell foam material of claim 10 comprising the reaction product of:
A. phenolic-resin
B. a blowing agent, and
C. a surfactant which is a surfactant of Formula IX of the attached drawings wherein:
(a) $R^5$ is an organic radical having 3 to 40 reactive groups,
(b) the $R^6$'s are independently selected from the group consisting of hydrogen and methyl,
(c) the $R^7$'s are independently selected from the group consisting of lower alkyl, phenyl, naphthyl, and benzyl,
(d) m is an integer from 1 to 80 inclusive,
(e) n is an integer from 3 to 40 inclusive,
(f) $R^8$ is independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms.

14. A laminated structural panel having at least one facing sheet and having adhered to it a closed cell foam material of claim 10 comprising the reaction product of:
A. an alkylol group containing phenolic polymer of Formula I of the attached drawings wherein:
(a) $R^1$ is

hydrogen, or a radical of Formula II of the attached drawings,
(b) the $R^2$'s are independently selected from the group consisting of lower alkyl, phenyl, benzyl, halo, nitro and hydrogen,
(c) the $R^3$'s are independently selected from the group consisting of

hydrogen, or a radical of Formula II of the attached drawings,
(d) the $R^4$'s are independently selected from the group consisting of lower alkyl, hydrogen, phenyl, benzyl, or furyl,
(e) x is an integer from 2 to 10 inclusive, (f) the phenolic polymer has a molecular weight between 200 and 2000,
B. a compound of Formula V of the attached drawings wherein the weight ratio of B:A is 1:30 to 1:2,
C. a blowing agent in a minor amount sufficient to foam the reaction mixture, and
D. a surfactant which is a surfactant of Formula IX of the attached drawings wherein:
(a) $R^5$ is an organic radical having 3 to 40 reactive groups,
(b) the $R^6$'s are independently selected from the group consisting of hydrogen and methyl,
(c) the $R^7$'s are independently selected from the group consisting of lower alkyl, phenyl, naphthyl and benzyl,
(d) m is an integer from 1 to 80 inclusive,
(e) n is an integer from 3 to 40 inclusive,
(f) $R^8$ is independently selected from the group consisting of hydrogen, a copolymer of dialkylmaleate and N-vinyl pyrrolidone and copolymer of dialkylmaleate and N-vinyl caprolactam wherein the alkyl of the maleate has 1 to 5 carbon atoms.

15. A laminated structural panel having at least one facing sheet and having adhered to it a closed cell foam material of claim 10 comprising the reaction product of:
A. a methylol group containing phenolic polymer of Formula III of the attached drawings wherein:
(a) $R^1$ is $HOCH_2-$, hydrogen or a radical of Formula IV of the attached drawings,
(b) the $R^3$'s are independently selected from the group consisting of $HOCH_2-$, hydrogen or a radical of Formula IV of the attached drawings,
(c) x is an integer from 3 to 6 inclusive,
(d) the phenolic polymer has a molecular weight between 300 and 1500, and
B. phenol, wherein the weight ratio of B:A is 1:20 to 1:5,
C. a blowing agent in a minor amount sufficient to foam the reaction mixture,
D. a surfactant which is a surfactant of Formula IX of the attached drawings wherein:
(a) $R^5$ is an organic radical having 3 to 40 reactive groups,
(b) the $R^6$'s are independently selected from the group consisting of hydrogen and methyl,
(c) the $R^7$'s are independently selected from the group consisting of lower alkyl, phenyl, naphthyl and benzyl,
(d) m is an integer from 1 to 80 inclusive,
(e) n is an integer from 3 to 40 inclusive,
(f) $R^8$ is independently selected from the group consisting of hydrogen, a copolymer of dialkylmaleate and N-vinyl pyrrolidone and a copolymer of dialkylmaleate and N-vinyl caprolactam wherein the alkyl of the maleate has 1 to 5 carbon atoms.

16. A laminated structural panel having at least one facing sheet and having adhered to it a closed cell foam material of claim 10 comprising the reaction product of:
A. phenolic-resin,
B. a blowing agent in a minor amount sufficient to foam the reaction mixture,
C. a surfactant which surfactant is the reaction product of
I. a polyoxyalkylene ether of Formula VIII of the attached drawings wherein:
a. $R^5$ is an organic radical having 3 to 15 reactive groups,
b. the $R^6$'s are independently selected from the group consisting of hydrogen and methyl, c. m is an integer from 1 to 80 inclusive,
d. n is an integer from 3 to 15 inclusive,
II. a compound selected from the group consisting of N-vinyl pyrrolidone and N-vinyl caprolactam,
III. di-lower alkyl maleate, wherein II and III form $R^8$,
IV. a capping agent selected from the group consisting of acetic acid, acetic anhydride, acetyl chloride and 3,5-dinitrobenzoyl chloride, so that the surfactant has a hydroxyl value less than 10.

17. A laminated structural panel having at least one facing sheet and having adhered to it a closed cell foam material of claim 10 comprising the reaction product of:
A. an alkylol group containing phenolic polymer of Formula I of the attached drawings wherein:
 (a) $R^1$ is

hydrogen, or a radical of Formula II of the attached drawings,
 (b) the $R^2$'s are independently selected from the group consisting of lower alkyl, phenyl, benzyl, halo, nitro and hydrogen,
 (c) the $R^3$'s are independently selected from the group consisting of

hydrogen, or a radical of Formula II of the attached drawings,
 (d) the $R^4$'s are independently selected from the group consisting of lower alkyl, hydrogen, phenyl, benzyl, or furyl,
 (e) x is an integer from 2 to 10 inclusive,
 (f) the phenolic polymer has a molecular weight between 200 and 2000,
B. a compound of Formula V of the attached drawings wherein the weight ratio of B:A is 1:30 to 1:2,
C. a blowing agent in a minor amount sufficient to foam the reaction mixture, and
D. a surfactant which surfactant is the reaction product of
 I. a polyoxyalkylene ether of Formula VIII of the attached drawings wherein:
  a. $R^5$ is an organic radical having 3 to 15 reactive groups,
  b. The $R^6$'s are independently selected from the group consisting of hydrogen and methyl,
  c. m is an integer from 1 to 80 inclusive,
  d. n is an integer from 3 to 15 inclusive,
 II. a compound selected from the group consisting of N-vinyl pyrrolidone and N-vinyl caprolactam,
 III. di-lower alkyl maleate, wherein II and III form $R^8$,
 IV. a capping agent selected from the group consisting of acetic acid, acetic anhydride, acetyl chloride and 3,5-dinitrobenzoyl chloride, so that the surfactant has a hydroxyl value less than 10.

18. A laminated structural panel having at least one facing sheet and having adhered to it a closed cell foam material of claim 10 comprising the reaction product of:
A. a methylol group containing phenolic polymer of Formula III wherein:
 (a) $R^1$ is $HOCH_2-$, hydrogen or a radical of Formula IV,
 (b) the $R^3$'s are independently selected from the group consisting of $HOCH_2-$, hydrogen or a radical of Formula IV,
 (c) x is an integer from 3 to 6 inclusive,
 (d) the phenolic polymer has a molecular weight between 300 and 1500, and
B. phenol, wherein the weight ratio of B:A is 1:20 to 1:5.
C. a blowing agent in a minor amount sufficient to foam the reaction mixture,
D. a surfactant which surfactant is the reaction product of:
 I. a polyoxyalkylene ether of Formula VIII wherein:
  a. $R^5$ is an organic radical having 3 to 15 reactive groups,
  b. the $R^6$'s are independently selected from the group consisting of hydrogen and methyl,
  c. m is an integer from 1 to 80 inclusive,
  d. n is an integer from 3 to 15 inclusive,
 II. a compound selected from the group consisting of N-vinyl pyrrolidone and N-vinyl caprolactam,
 III. di-lower alkyl maleate, wherein II and III form $R^8$
 IV. a capping agent selected from the group consisting of acetic acid, acetic anhydride, acetyl chloride and 3,5-dinitrobenzoyl chloride, so that the surfactant has a hydroxyl value less than 10.

19. A laminated structural panel having at least one facing sheet and having adhered to it a closed cell foam material of claim 1 wherein the surfactant is selected from the group consisting of sorbitan (polyoxyethylene acetate)$_5$, sorbitan (polyoxypropylene acetate)$_5$, glycerol tris (polyoxyethylene acetate), glycerol tris (polyoxypropylene propionate), 1,1,1-trimethylol-propane (polyoxyethylene acetate), pentaerythritol (polyoxyethylene acetate)$_3$, polyoxyethylene sorbitan palmitate, polydimethyl siloxane polyalkylene oxide block copolymer esterified with a lower alkyl carboxylic acid, polyethylene glycol adipate (polyoxyethylene acetate), polyethylene glycol tartarate (polyoxyethylene acetate) and mixtures thereof.

20. A laminated structural panel having at least one facing sheet and having adhered to it a closed cell foam material of claim 1 wherein the closed cell content is 80%.

21. A laminated structural panel having at least one facing sheet and having adhered to it a closed cell foam material of claim 1 wherein the thermal conductivity value of the foam material is 0.1 to 0.2 BTU-inch/Hr-°F-sq. ft. at 24° C.

22. A laminated structural panel having at least one facing sheet and having adhered to it a closed cell foam material of claim 4 wherein the capping agent is selected from the group of lower alkyl carboxylic acids, lower alkyl carboxylic anhydrides and lower alkyl carboxylic acid chlorides.

* * * * *